Figure 1:
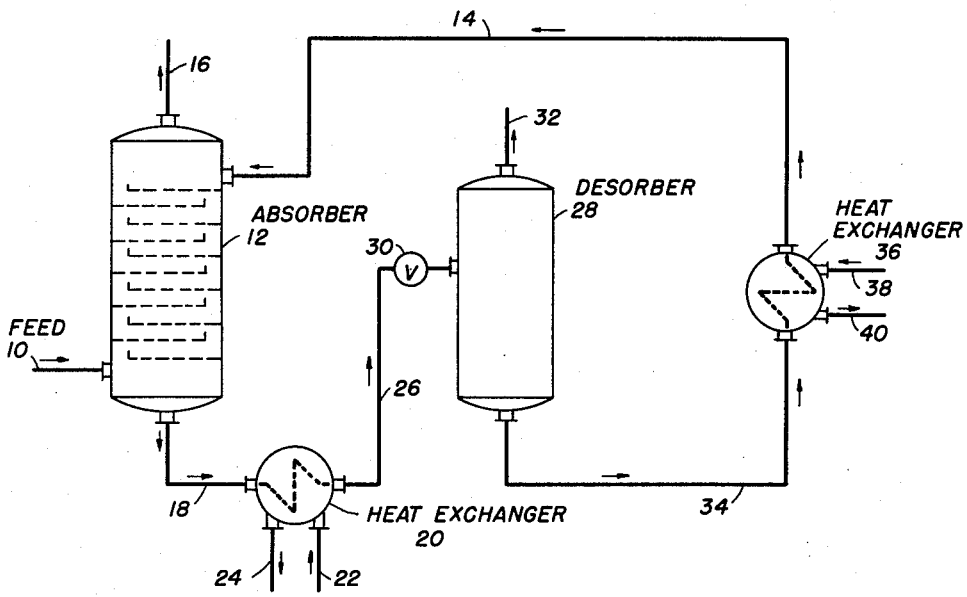

July 27, 1965  L. N. MILLER  3,196,596
METHOD FOR ABSORPTION OF CARBON DIOXIDE
Filed Dec. 19, 1961

INVENTOR.
LOREN N. MILLER
BY Edward W. Lang
ATTORNEY

3,196,596
METHOD FOR ABSORPTION OF CARBON DIOXIDE
Loren N. Miller, Crystal Lake, Ill., assignor to The Pure Oil Company, Chicago, Ill., a corporation of Ohio
Filed Dec. 19, 1961, Ser. No. 160,562
2 Claims. (Cl. 55—48)

This invention relates to absorption processes for separating fluid mixtures and, more particularly, to the utilization of the heat effects in a conventional absorption-desorption process as a source of refrigeration. This invention is especially useful in processes for removing constituents from oil-field and petroleum-refinery fluid mixtures.

In conventional absorption processes wherein at least one component is separated from a fluid mixture by being selectively absorbed in an absorbent, and later is recovered by expansion of the rich absorbent, heat effects having opposite signs are noted in the absorption and desorption steps. To illustrate, in separating a component from a fluid mixture, such as a hydrocarbon from a well fluid containing the same, by contacting the mixture with an absorbent to preferentially absorb the component, a rise in temperature occurs in the absorber, the magnitude of which depends upon factors such as the nature of the absorbent, the amount of the component absorbed, and the pressure maintained in the absorber. After carrying out the contacting step, the rich absorbent is separated from the unabsorbed components, and the absorbed component is recovered by introducing the rich absorbent into a flashing zone and/or a stripping zone wherein its pressure is reduced, resulting in a tempearture drop.

This invention is based upon the discovery that the cooling effect accompanying the desorption can be utilized as a very economical source of refrigeration. In general, my invention consists of an absorption-desorption system for the removal of one or more constituents from a fluid mixture in which heat is removed from the rich absorbent as it flows from the absorber to the desorber, and the desorbed absorbent is utilized as a source of refrigeration. Sufficient heat is removed from the rich absorbent so that the further cooling effect derived from the expansion of the rich absorbent during the desorption step reduces the temperature of the lean absorbent, which is withdrawn from the desorber, to the low temperature levels needed for some types of refrigeration. Low temperatures are attained more economically by chilling the rich absorbent by heat exchange in accordance with this invention than by conventional methods, since such chilling is done at a temperature level where it is accomplished relatively easily and with a relatively small heat-transfer area. On the other hand, prior art methods of chilling refrigerants to very low temperatures have been based on indirect heat exchange at low temperatures where heat exchange is difficult and relatively large heat-transfer areas are required.

An example of one of the more advantageous applications of my invention is in a process for the recovery of components from natural gas, which includes steps for recovering and purifying helium. Temperatures in the range below about —60° F. are required in a conventional helium-purification section of such a process. In accordance with this invention, very low temperatures are attained in the lean absorbent circulating within the initial absorption-desorption section of the process, and this very cold, lean absorbent is utilized as the refrigerant in the helium-purification section of the process. This invention can be easily incorporated in a conventional absorption-desorption system to obtain the required, very low temperatures for the helium-purification process, whereas the installation of conventional refrigeration systems to obtain the low temperatures would be extremely expensive.

It is an object of this invention to utilize the temperature drop produced when an absorbed fluid is recovered from a rich absorbent by a reduction in pressure of the rich absorbent.

Another object of this invention is to utilize as a source of refrigeration, an absorption-desorption system for recovering at least one component from a fluid mixture.

A further object of this invention is to provide an absorption-desorption system in which heat is removed from the rich absorbent as it flows from the absorber to the desorber.

A still further object of this invention is to provide an absorption-desorption process in which heat is removed from a critical point in the process to attain a low-temperature stream suitable for use as a refrigerant in a subsequent step of the process, or in a separate process.

Figure 2:
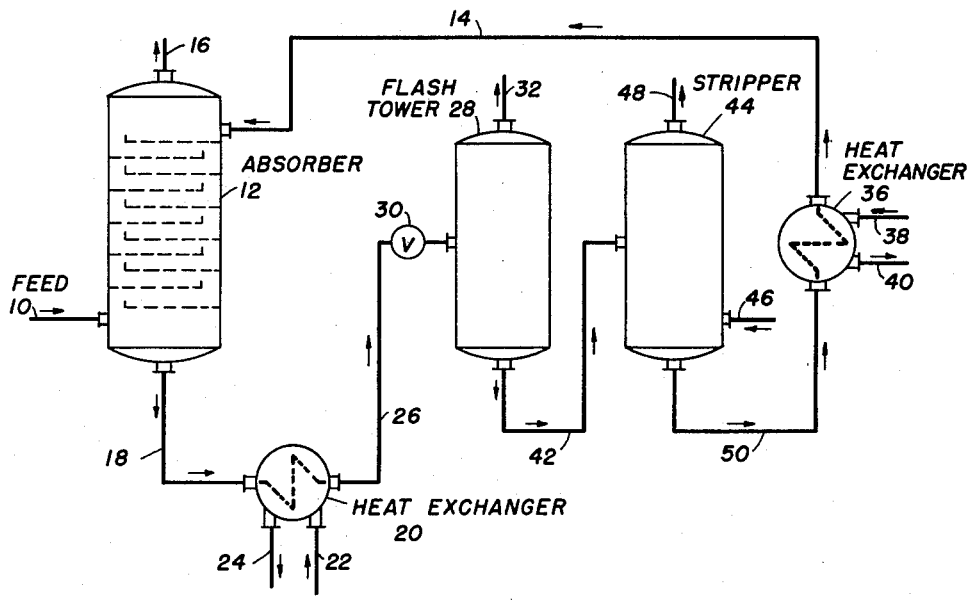

These, and further objects of the invention will become apparent as the description herein proceeds and reference is made to the accompanying drawings in which;

FIGURE 1 is a diagrammatic illustration of an absorption-desorption system for carrying out the process of this invention; and FIGURE 2 is a diagrammatic illustration of an alternative embodiment of an absorption-desorption system for carrying out this invention.

In accordance with my invention, an absorption liquid is contacted with a fluid mixture in an absorber under proper conditions to preferentially absorb at least one of the components of the mixture. Then according to this invention, the rich absorbent, which is separated from the unabsorbed components and withdrawn from the absorber, is chilled before it is introduced into a desorber, where the absorbed component is recovered under conditions resulting in a temperature drop of the absorbent. The temperature of the lean absorbent leaving the desorber is extremely low and, accordingly, it is advantageously utilized in heat exchangers as a refrigerant in a subsequent step of the process, or in a separate process.

This invention is best understood by reference to the attached drawings wherein like characters of reference designate like components of an absorption-desorption process. Referring to FIGURE 1, the feed fluid mixture, containing at least one component which is to be recovered, is fed through line 10 into the bottom of absorber 12. An absorbent is introduced into the top of absorber 12 through line 14. No invention is claimed for any specific absorbent utilized, but any absorbent known in the art for preferentially absorbing a desired part of a feed mixture, depending upon the nature of the feed and the constituent to be recovered, can be utilized so long as a substantial portion of the absorbed constituents can be recovered from the rich absorbent by a reduction in pressure without the application of heat. Absorber 12 can be any suitable absorption column, such as a vertically extended column containing appropriate packing or trays to assure intimate countercurrent contact of the rising feed mixture with the down-flowing absorbent. Absorber 12 is maintained under such conditions of pressure, usually superatmospheric, and temperature that the desired portion of the feed mixture is absorbed. The fluid mixture from which one or more constituents have been absorbed is then removed from absorber 12 through line 16 to a suitable receiver or other disposition.

Enriched absorbent is withdrawn from absorber 12 through line 18 and is cooled in accordance with my invention. The rich absorbent is cooled by any suitable method, such as passing it through heat exchanger 20 where it is cooled by indirect heat exchange with coolant introduced through line 22 and withdrawn through line 24. Then the cooled, rich absorbent is passed through line 26 to desorber 28 where the absorbed constituents are recovered under conditions to cause a simultaneous cooling of the absorbent. Desorber 28 can be a flash chamber into which the rich absorbent is introduced after undergoing a controlled pressure reduction through expansion valve 30. As an alternative embodiment, expansion valve 30 can be eliminated and desorber 28 can be a stripping column into which a suitable stripping medium is introduced. Desorber 28 is maintained at a pressure below the absorption column pressure, and usually at about atmospheric pressure. As the absorbent undergoes a pressure reduction, it is chilled to a very low temperature and the absorbed components are vaporized out of it and are withdrawn from desorber 28 through line 32 to be disposed of as desired.

The resulting chilled, lean absorbent is withdrawn from desorber 28 through line 34 and is passed through heat exchanger 36 where, in accordance with this invention, it is used as a refrigerant to cool material introduced through line 38 and withdrawn from line 40. The resulting warmed, lean absorbent is then returned through line 14 to absorber 10.

FIGURE 2 shows a modification of the embodiment described in relation to FIGURE 1, for use in instances where it is desirable to utilize a stripping operation after a flashing operation. Referring to FIGURE 2, part of the absorbed constituents are removed from the rich absorbent by a controlled pressure-reduction through expansion valve 30 into flash tower 28. The constituents which are recovered from the absorbent by the pressure reduction and consequent cooling are withdrawn through line 32. The chilled absorbent from which the absorbed constituents have been partially recovered is passed from flash tower 28 through line 42 to stripping column 44 in contact with air or other inert stripping gas introduced through line 46. In stripping column 44, substantially all of the remaining absorbed constituents are removed and withdrawn through line 48. The stripping operation may result in an additional slight cooling of the absorbent. The resulting chilled, lean absorbent is then withdrawn from stripping column 44 through line 50, where it is passed through heat exchanger 36 and thence recycled to absorption tower 10.

The process of this invention is applicable to the treatment of any type of fluid mixture from which components thereof can be recovered by absorption. It is only essential that the desorption step takes place under conditions to cause a temperature drop to occur in the absorbent, as by flashing and/or stripping. For example, this invention is applicable to the treatment of hydrocarbon mixtures of normally gaseous hydrocarbons and normally liquid hydrocarbons. My invention may be utilized in absorption-desorption processes for separating aliphatic hydrocarbons of differing degrees of saturation, such as mono-olefins from paraffins, such as ethylene from methane; diolefins from paraffins, such as butadiene from butane; diolefins from mono-olefins, such as butadiene from butylene; and acetylenes from more saturated hydrocarbons, such as acetylene from propane. My invention may also be utilized in absorption-desorption systems for separating hydrocarbons of the same degree of saturation but having different numbers of carbon atoms per molecule, such as separating mixtures of paraffins, e.g., methane from ethane, and mixtures of olefins, e.g., propylene and butylene, as well as hydrocarbons of the same degree of saturation and having the same number of carbon atoms per molecule, e.g., butane and isobutane. This invention may also be utilized in absorption processes for treating mixtures comprised of hydrocarbons and nonhydrocarbons. For example, it is applicable in processes for separating hydrocarbons, such as ethane, and/or nonhydrocarbons, such as carbon dioxide from natural gas. The fluid mixture which is treated by an absorption process utilizing this invention will usually be composed of normally gaseous components, but normally liquid components may be present in the feed. To illustrate, in absorption processes for resolving hydrocarbon mixtures, the hydrocarbon feed will normally have components containing up to 4 carbon atoms per molecule, but hydrocarbons having more than 4 carbon atoms per molecule may be present in the mixture. However, the absorption system may be utilized to separate mixtures of hydrocarbons containing more than 4 carbon atoms per molecule.

The process of this invention is carried out in accordance with known methods in the absorption art, with the modifications herein asserted. Any method of effecting contact between the feed mixtures and the absorbent can be used. Although the process may be batch-wise or continuous, a continuous process is preferred. Temperature and pressure conditions taught by the art for effecting absorption and desorption may be utilized except that it is essential that no heat be applied to the desorber during the recovery of the absorbed feed component. The temperature conditions maintained in the desorber can be regulated by varying the amount of heat withdrawn from the rich absorbent before it is introduced into the desorption step.

The following specific example will serve further to more particularly point out the invention:

A natural-gas mixture, consisting of 25% carbon dioxide and 75% methane, is charged at a rate of 2,400 M s.c.f./hour to an absorption tower operated under a pressure of 800 p.s.i. at a temperature of approximately −50° F., countercurrent to an absorbent capable of removing carbon dioxide from the feed gas mixture, such as methyl alcohol. The absorbent is pumped into the absorption tower at a temperature of −50° F. and a rate of 800 gallons per minute. The absorbent contacting the natural-gas feed counter-currently scrubs the carbon dioxide out to a level of 5% and the unabsorbed gas is withdrawn from the top of the tower at a rate of 1800 M s.c.f./hour. The rich absorbent, which is withdrawn from the absorption tower, is warmed to a temperature of 5° F. as a result of absorbing 12.5 s.c.f. carbon dioxide/ gallon of absorbent. The rich absorbent is then cooled to 0° F. by applying chilling thereto. The rich absorbent is expanded to one atmosphere pressure with the release of 600 M s.c.f./hour of absorbed carbon dioxide and the heat of absorption is counterbalanced by a corresponding heat of desorption. Other heat effects, such as heat involved in expanded the carbon dioxide, are substantially canceled by heat inputs from pumping inefficiencies. The reduction in pressure of the absorbent cools it to a temperature of about −55° F. The cooled, lean absorbent is passed through a heat exchanger where it is utilized as a refrigerant and consequently warmed to a temperature of −50° F. and then recycled to the absorption tower.

In order to demonstrate that refrigeration is obtained at significantly lower cost by my invention than by conventional methods, the amount of refrigeration obtained in the above example is about 100 tons, calculated as follows:

$$\text{Refrigeration (Tons)} = \frac{(800 \text{ g.p.m.}) (5 \text{ B.t.u./gal./°F.}) (5° \text{ F.})}{(200 \text{ B.t.u./min./ton})} = 100$$

If a refrigeration cycle were not imposed in accordance with this invention, the absorption process could operate about 5° colder with an increase in absorption of carbon dioxide from about 12.5 to 12.8 s.c.f./gallon, reducing the liquid pumping requirement from 800 to about 780 g.p.m. The only additional operating cost of the absorption process caused by the superimposition of the refrigeration cycle, is the additional power required to pump the extra 20 gallons per minute of absorbent. Assuming a pump efficiency of about .80, this amounts to about 11.7 H.P., calculated as follows:

Pump (H.P.) =
$$\frac{(20 \text{ g.p.m.})(800 \text{ p.s.i.})(144 \text{ p.s.f./p.s.i.})}{(7.58 \text{ gal./c.f.})(33,000 \text{ ft. lb./min./H.P.})(.80 \text{ eff.})} = 11.7$$

It can be seen that refrigeration is obtained at a horsepower/ton ratio of 0.117 H.P./ton by this invention, which is a highly significant improvement over conventional to 3 H.P./ton requirements of conventional refrigeration systems.

Although the invention has been described in connection with specific embodiments, it will be apparent that modifications can be made by one skilled in the art without departing from the intended scope of this invention. For example, heavy components of the feed-gas mixture can be removed by passing the mixture through a condensate separation zone before it is introduced into the absorption zone. It will be evident that the absorption-desorption system can include a stripping operation, with the application of heat to effect complete removal of the absorbed components of the feed gas, between the heat exchanger (where refrigeration is obtained from the cooled absorbent) and the absorber.

The embodiments of this invention in which an exclusive property or privilege is claimed are defined as follows:

1. A process of separating carbon dioxide from natural gas containing carbon dioxide which consists in introducing said natural gas into an absorption zone maintained at about 800 p.s.i., wherein said natural gas is contacted with a liquid absorbent introduced into said absorption zone at a temperature of about —50° F., and effecting preferential absorption of said carbon dioxide in said absorbent, removing from said absorption zone a stream of rich absorbent at a temperature of about 5° F., cooling said rich absorbent to about 0° F., reducing the pressure of said rich absorbent to desorb carbon dioxide from said rich absorbent with a simultaneous cooling of said rich absorbent to about —55° F., utilizing the desorbed cooled absorbent at a source of low-temperature refrigeration for recovering helium from natural gas and purifying it by passing said cooled absorbent through a heat exchanger in a helium purification process wherein the temperature of the desorbed absorbent is raised to about —50° F. to cool the helium-containing natural gas to the low temperature required for helium purification, and recycling the desorbed absorbent at about —50° F. to said absorption zone.

2. A process in accordance with claim 1 wherein said gaseous mixture, consisting of 25 percent carbon dioxide and 75 percent methane, is introduced into said absorption zone at a rate of about 2400 M s.c.f./hour, and said absorbent is introduced into said absorption zone at a rate of about 800 gallons per minute.

References Cited by the Examiner
UNITED STATES PATENTS

| | | | |
|---|---|---|---|
| 2,649,166 | 8/53 | Porter et al. | 55—42 |
| 2,781,862 | 2/57 | Fussman | 55—56 |
| 2,826,266 | 3/58 | Hachmuth et al. | 55—43 |
| 2,863,527 | 12/58 | Herbert et al. | 62—17 |
| 2,870,868 | 1/59 | Eastman et al. | 62—17 |
| 2,880,591 | 4/59 | Kwauk | 62—17 |
| 2,926,751 | 3/60 | Kohl et al. | 55—68 |
| 2,926,752 | 3/60 | Redemann et al. | 55—44 |
| 3,021,682 | 2/62 | Baker et al. | 55—55 X |

REUBEN FRIEDMAN, *Primary Examiner.*